July 7, 1936.  E. K. FURSTNOW  2,046,679
SWEEPER
Filed Dec. 2, 1935    3 Sheets-Sheet 1

Inventor
Earl K. Furstnow
By Clarence A. O'Brien and
Hyman Berman
Attorneys

July 7, 1936.  E. K. FURSTNOW  2,046,679
SWEEPER
Filed Dec. 2, 1935  3 Sheets-Sheet 2

Inventor
Earl K. Furstnow

By Clarence A. O'Brien and
Hyman Berman
Attorneys

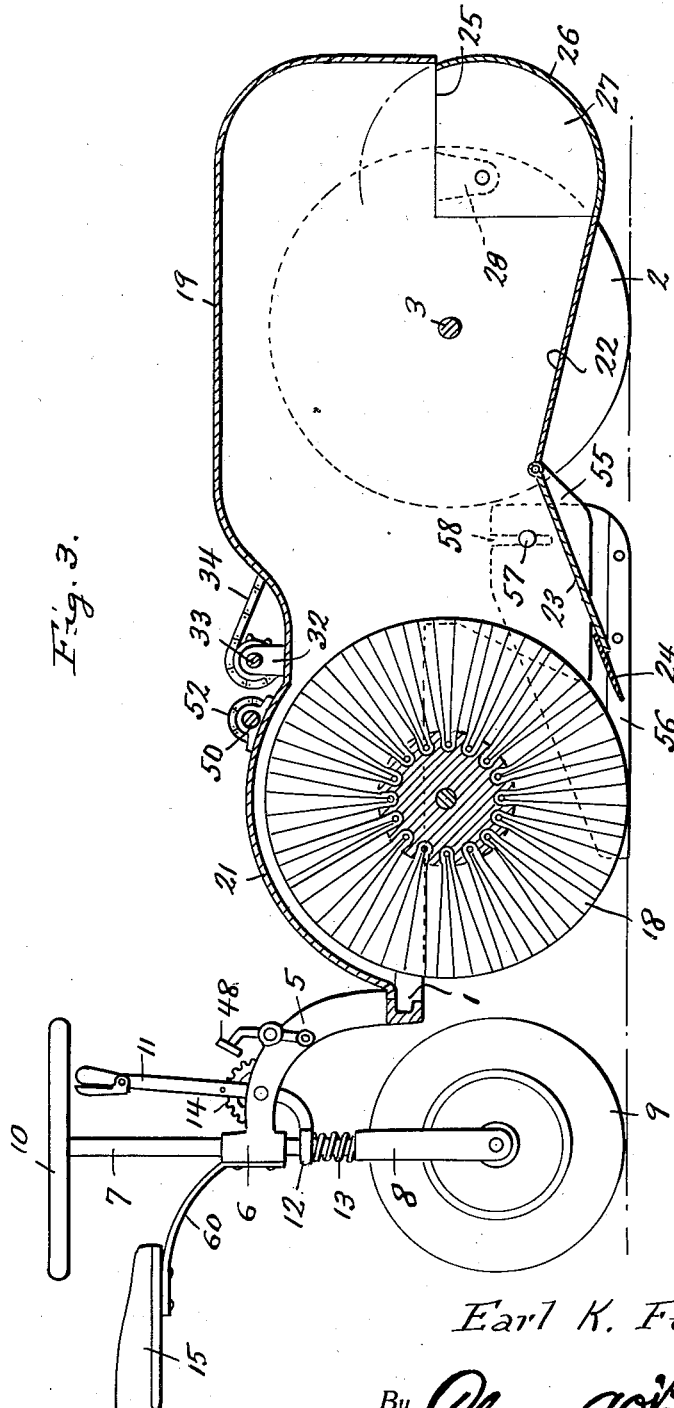

Patented July 7, 1936

2,046,679

REISSUED

UNITED STATES PATENT OFFICE 2,046,679

SWEEPER

Earl K. Furstnow, Los Angeles, Calif.

Application December 2, 1935, Serial No. 52,567

1 Claim. (Cl. 15—83)

The present invention relates to new and useful improvements in sweepers of the power type and has for one of its important objects to provide a comparatively small machine of this character for use particularly in sweeping streets, sidewalks, warehouses, etc.

Another important object of the invention is to provide a sweeping machine of the aforementioned character comprising a hopper having novel dumping means.

Other objects of the invention are to provide a sweeper of the character described which will be simple in construction, strong, durable, highly efficient and reliable in use, compact, light in weight, attractive in appearance, and which may be manufactured and operated at low cost.

All of the foregoing and still further objects and advantages of the invention will become apparent from a study of the following specification, taken in connection with the accompanying drawings wherein like characters of reference designate corresponding parts throughout the several views, and wherein:—

Figure 3 is a view in vertical longitudinal section through the invention, taken substantially on the line 3—3 of Figure 2.

Figure 1:
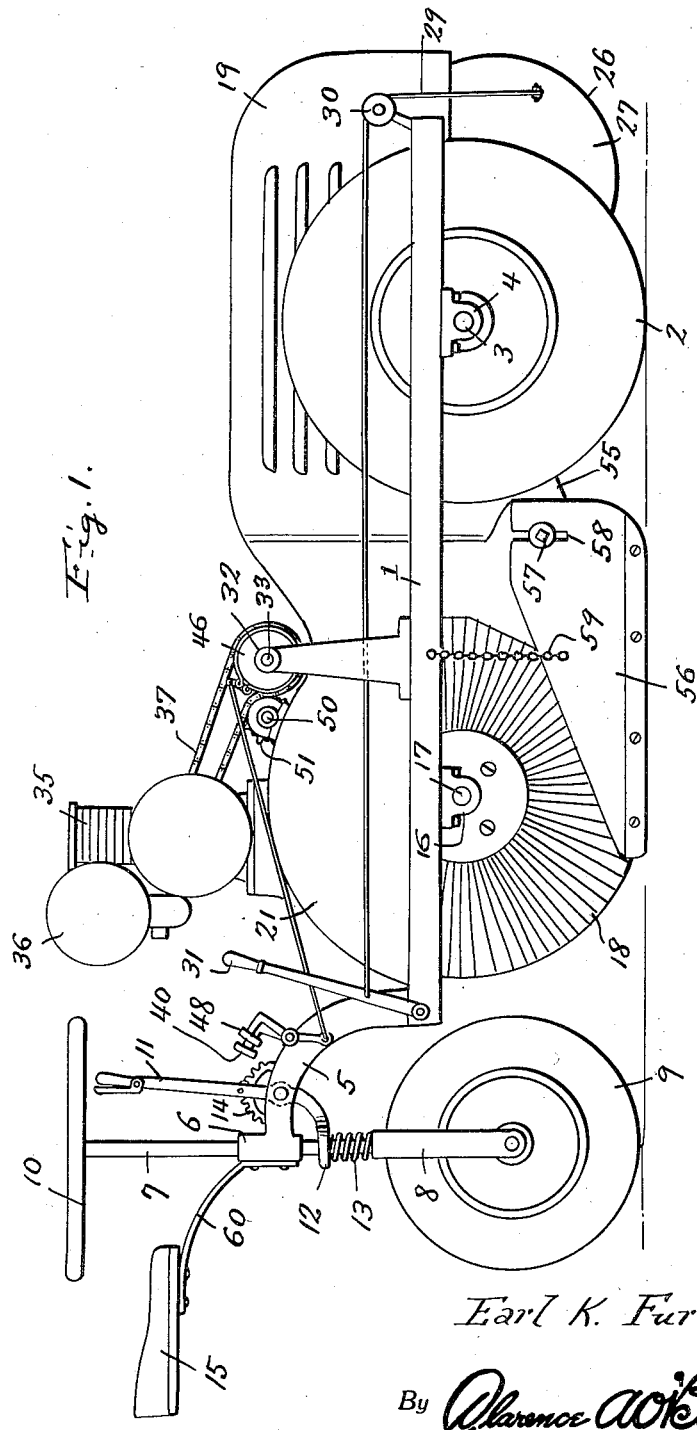
Figure 1 is a view in side elevation of a sweeper constructed in accordance with the present invention.

Referring now to the drawings in detail, it will be seen that the embodiment of the invention which has been illustrated comprises a frame 1, the forward end portion of which is supported on a pair of rubber tired front wheels 2. The front wheels 2 are mounted on an axle 3 which is journaled in bearings 4 beneath the frame 1. As illustrated to advantage in Figure 2 of the drawings, the right hand wheel 2 is located within the frame 1 for permitting sweeping close to a curb, wall or the like.

Rising from the rear end of the frame 1 is a rearwardly curved arm 5 having a vertical bearing 6 on its free end. Rotatably and slidably mounted in the bearing 6 is a vertical shaft 7 having a fork 8 on its lower end in which a rubber tired wheel 9 is journaled for supporting the rear end of the frame 1. A steering wheel 10 is fixed on the upper end of the shaft 7. Pivotally mounted, at an intermediate point, on the arm 5 is a hand lever 11 having a yoke 12 on one end which straddles the shaft 7 below the bearing 6. Encircling the shaft 7 is a coil spring 13 upon which the yoke 12 rests and which, in turn, rests on the fork 8. Suitable latching means 14 is provided for releasably locking the lever 11 in adjusted position. As is thought to be apparent, by adjusting the lever 11 the rear end of the frame 1 may be raised or lowered. Further, the spring 13 yieldingly supports the rear end of the frame 1. Mounted on the vertical bearing 6 is an operator's seat 15.

Journaled in bearings 16 beneath the rear portion of the frame 1 is the shaft 17 of a rotary broom 18. Extending forwardly from the broom 18 on the frame 1 is a hopper 19 having one side portion recessed, as at 20, to accommodate the right hand wheel 2. Projecting rearwardly from the hopper 19 is an arcuate shield or housing 21 which extends over the broom 18. The hopper 19 includes a forwardly inclined bottom 22 to the rear end of which a plate 23 is hingedly connected. Mounted on the free rear end portion of the hinged plate 23 is a rubber ground engaging lip or blade 24. The lower portion of the forward end of the hopper 19 is formed to provide a discharge opening 25 which is closed by a door 26 of substantially segmental cross section, said door including side walls 27. The side walls 27 of the door 26 are pivotally mounted on hangers, brackets or the like 28 on the side walls of the hopper 19. The door or closure 26 is adapted to swing upwardly into the forward portion of the hopper 19. An operating cable 29 is connected, at one end, to the door 26, said cable being trained over a pulley 30 on the forward end portion of the frame 1 and having its other end connected to a hand lever 31 on the rear end portion of said frame 1. When in closed position, the door 26 abuts the forward end of the inclined bottom 22 and constitutes a continuation thereof.

Figure 2:
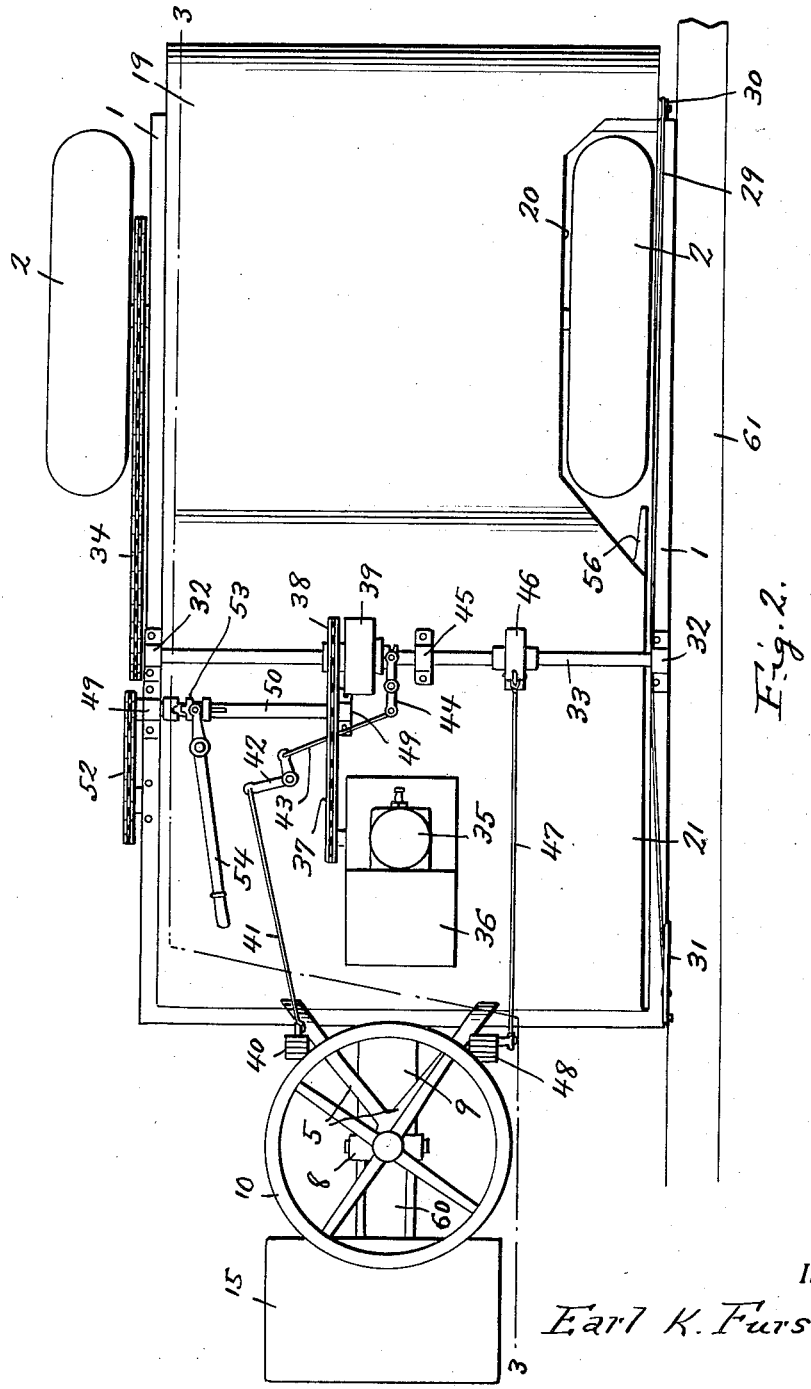
Figure 2 is a top plan view thereof.

Journaled in bearings 32 which are mounted on the frame 1 at an intermediate point is a transverse drive shaft 33 which is operatively connected to the axle 3 for driving the wheels 2 by a chain and sprocket connection 34 (see Figure 2). Mounted on the housing 21 is a suitable engine 35 which is provided with a fuel tank 36. A chain 37 is trained around a sprocket gear 38 which is loosely mounted on the shaft 33 and around a sprocket gear on the shaft of the engine 35 for driving said shaft 33. A suitable clutch 39 is provided for connecting and disconnecting the sprocket gear 38 and the shaft 33. The clutch 39 is operatively connected to a foot pedal 40 adjacent the operator's seat 15 by means including a rod 41, a bell crank lever 42, another rod 43, and a forked lever 44. A bearing 45 is provided for the shaft 33 at an intermediate point. The reference numeral 46 designates a suitable brake for the shaft 33, said brake being connected by a rod 47 to a foot pedal 48 adjacent the operator's seat 15.

Journaled in bearings 49 rearwardly of the shaft 33 is a comparatively short shaft 50 which parallels said shaft 33. Fixed on one end portion of the shaft 50 is a sprocket gear 51 over which the lower flight of the chain 37 travels. The shaft 50 drives the broom 18 in a counterclockwise direction through a chain and sprocket connection 52. A suitable clutch 53 is provided for connecting the broom 18 to the shaft 50 or for disconnecting said broom therefrom, said clutch 53 being operated by a hand lever 54. It will be seen that the driving mechanism which has been described is such that the wheels 2 are driven in a clockwise direction for propelling the machine forwardly, while the rotary broom 18 is driven in the opposite direction.

Mounted on the lower portions of the side walls 55 of the hopper 19 are shields 56 which extend rearwardly adjacent the ends of the broom 18. Bolts 57 are provided for adjustably securing the shields 56 to the hopper side walls 55, said shields having vertical slots 58 therein which accommodate said bolts. Safety chains 59 (see Figure 1) connect the shields 56 to the frame 1.

It is thought that the operation of the machine will be readily apparent from a consideration of the foregoing. With the clutch 39 in engaged position, the engine 35 drives the wheels 2 in a clockwise direction for pulling the machine forwardly. If desired, the clutch 39 may be of the reversing type to permit the machine to be backed. With the clutch 53 in engaged position the broom 18 is rotated in a counterclockwise direction for throwing dirt, trash, leaves, etc. up the chute provided by the hinged plate 23 into the hopper 19 where it rests on the inclined bottom 22 and the closure or door 26. The hinged plate 23, together with the rubber lip or blade 24, prevents the rapidly rotating broom 18 from throwing the dirt, etc. forwardly beneath the hopper 19 and, of course, the shields 56 prevent the dirt, etc. from being thrown laterally by the broom. The rubber lip or blade 24 rides easily over obstructions and irregularities that may be encountered in the ground, pavement or the like. To empty the hopper 19, the lever 31 is actuated to swing the door or closure 26 forwardly and upwardly into the forward portion of said hopper 19 for dropping the dirt, etc., in a substantially vertical plane onto the ground. The door or closure 26 may return by gravity to closed position. Of course, springs may also be provided, if desirable or necessary, for yieldingly retaining the door or closure 26 in closed position. When it is desired to disconnect the broom 18 from the engine 35 it is only necessary, of course, to throw the clutch 53 to disengaged position. As hereinbefore stated, the wheels 2 may be readily disconnected from the engine 35 through the medium of the clutch 39. The machine is braked by simply actuating the foot pedal 48. By raising or lowering the rear end of the frame 1 through the medium of the lever 11 the broom 18 may be adjusted vertically as desired. In this manner the pressure of the broom may be controlled as desired, also, wear on said broom may be compensated for. As best seen in Figure 2 of the drawings, the arcuate arm 5 which carries the bearing 6, the seat 15, etc., is substantially V-shaped in plan. The support on which the operator's seat 15 is mounted is designated by the reference numeral 60. In Figure 2 of the drawings, a curbing is designated by the reference numeral 61.

It is believed that the many advantages of a sweeper constructed in accordance with the present invention will be readily understood, and although a preferred embodiment of the machine is as illustrated and described, it is to be understood that changes in the details of construction and in the combination and arrangement of parts may be resorted to which will fall within the scope of the invention as claimed.

What is claimed is:—

A sweeper comprising a frame for supporting a rotatable broom and hopper, a pair of supporting wheels mounted on the forward portion of said frame, a substantially V-shaped, arcuate arm having its extremities attached to the rear portion of said frame and its apex located at a point rearward of and above the rear end of the frame, a vertical bearing located at the apex of the V-shaped arm, a shaft rotatably and slidably mounted in the bearing, a fork on the lower end of said shaft, a supporting and steering wheel journaled in the fork, a hand wheel fixed on the upper end of the shaft for turning the steering wheel, a hand lever pivotally mounted, at an intermediate point, on the arm, a yoke on one end of the hand lever straddling the shaft below the bearing, and a coil spring encircling the shaft and having one end engaged with the fork and its other end engaged with the yoke, said lever and coil spring constituting means for raising and lowering the rear end of the frame and for yieldingly supporting said rear end of said frame.

EARL K. FURSTNOW.